May 22, 1923.

G. O. DITTON

ELECTRIC COOKER AND HEATER

Filed Aug. 16, 1921

1,455,909

Inventor
G. O. Ditton
By Lacy & Lacy, Attorneys

Patented May 22, 1923.

1,455,909

UNITED STATES PATENT OFFICE.

GEORGE O. DITTON, OF LANOKA, NEW JERSEY.

ELECTRIC COOKER AND HEATER.

Application filed August 16, 1921. Serial No. 492,705.

To all whom it may concern:

Be it known that I, GEORGE O. DITTON, a citizen of the United States, residing at Lanoka, in the county of Ocean and State of New Jersey, have invented certain new and useful Improvements in Electric Cookers and Heaters, of which the following is a specification.

This invention relates to an improved electric cooker and heater and has as one of its principal objects to provide a device of this character wherein a minimum of current will be consumed to effect the cooking operation.

A further object of the invention is to provide a device employing a cooking vessel wherein the vessel will be jacketed by heat refracting material and wherein a vacuum chambered container will be provided for the vessel to the end that a maximum amount of heat may be retained in the vessel.

And the invention has as a still further object to provide a device wherein a heat storing member will be employed in conjunction with the cooking vessel so that after the contents of the vessel have been raised to the desired temperature and said member has become heated, the electric current may be cut off.

Other and incidental objects will appear hereinafter.

In carrying the invention into effect, I employ a casing or container 10 which is formed with spaced inner and outer walls to define a vacuum chamber 11 therebetween, the walls being coated at their inner sides with a heat reflecting layer of glass 11'. At its lower end, the container is preferably equipped with legs 12 and threaded through the outer wall of the container at the bottom thereof is an appropriate valve 13 to which a suitable pump may be connected for exhausting air from the chamber 11. At one side of the container the inner wall thereof is, as best brought out in Figure 2, bent to provide a vertically disposed channel member 13'.

Figure 1:
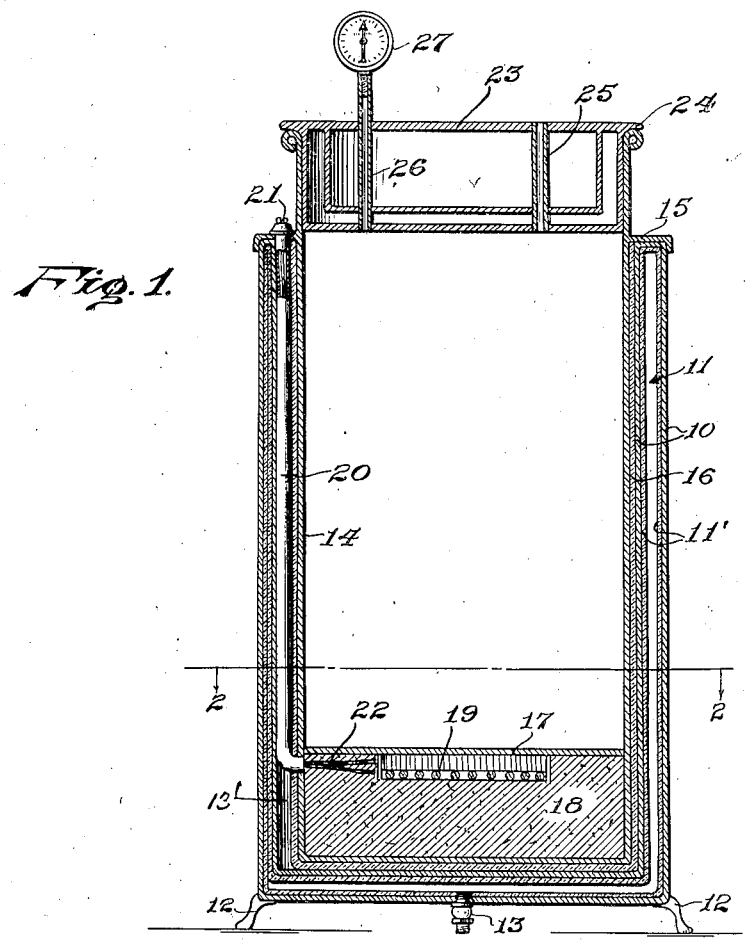
Figure 1 is a vertical section taken medially through my improved device.
Figure 2:
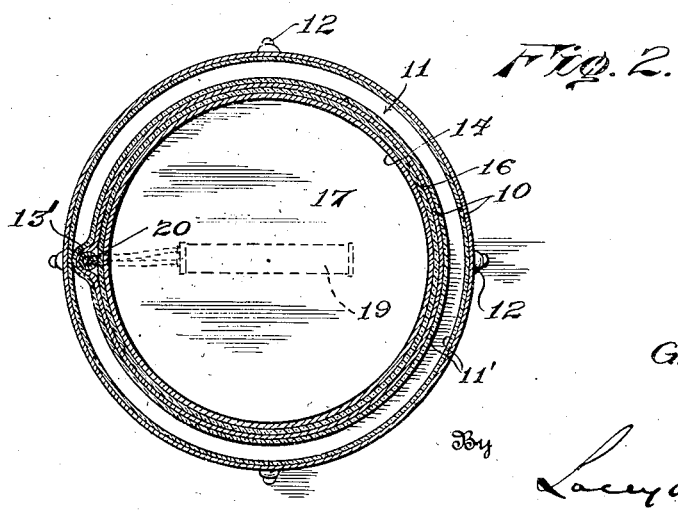
Figure 2 is a horizontal section on the line 2—2 of Figure 1, looking in the direction of the arrows.

Snugly but removably fitting in the container is a cooking vessel 14 provided near its upper end with a radial annular flange 15 overhanging the upper end edge of the container 10 seating flat thereagainst, the cooking vessel extending somewhat above the container. Surrounding the cooking vessel below the flange 15 is a heat refracting jacket 16. This jacket is preferably formed of glass and snugly fits the wall of the vessel. Arranged within the lower end portion of the vessel is a false bottom 17 and confined between the false bottom and the bottom wall of the vessel is a heat storage disc or member 18. This disc may be formed of soapstone or clay and countersunk in the upper face of said disc to lie immediately beneath the false bottom 17 is an appropriate resistance element 19. Leading at its lower end through the jacket 16 and through the wall of the cooking vessel is a conduit 20, the upper end of which is connected to the flange 15 of the vessel and mounted upon said flange at the upper end of the conduit is a suitable switch 21. As shown in Figure 2, the conduit is snugly but slidably received within the channel member 13 of the container and extending from the resistance element through said conduit to the switch are circuit wires 22. Thus, the flow of current through the resistance element may be readily controlled.

Snugly fitting in the upper end of the cooking vessel is a closure 23 therefor. This closure, like the container, is formed of spaced inner and outer walls defining an insulating air chamber therebetween and, as will be observed, the lower end of the closure extends substantially to the plane of the flange 15 of the vessel while at its upper end the closure is provided with a annular flange 24 overhanging the upper end edge of the vessel. Extending through the closure is a vent pipe 25. A second pipe 26 also extends through the closure and mounted upon the upper end of this pipe is a suitable thermometer 27.

In use, the material to be cooked is placed within the vessel 14 when the vessel is then closed by the closure 22 and the vessel fitted into the container. The circuit through the resistance element 19 is then closed when the contents of the vessel will, of course, be heated. Coincidently, the heat storage disc 18 will also be heated so that after the contents of the vessel have reached the desired temperature, as will be indicated by the thermometer 27, the flow of current to the resistance element may be cut off. Heat radiating from the disc 18 will then serve to complete the cooking operation. As will be appreciated, the vacuum chamber 11 of the container will tend to prevent the loss of heat through the container while the refractory jacket 16 will tend to prevent the radiation of heat from the cooking vessel to the container. Furthermore, the insulating air chamber of the closure of the cooking vessel will tend to prevent loss of heat through the closure. Accordingly, a maximum of the heat generated will be utilized for cooking the contents of the cooking vessel so that the current to the resistance element may be cut off early during the cooking operation while the cooking will be thoroughly completed by the heat radiating from the storage disc 18. I thus provide a device whereby a material saving in current may be effected.

Having thus described the invention, what is claimed as new is:

1. An electric cooker comprising a receptacle having a heat-resisting bottom and side, a vessel fitting snugly within the receptacle, a heat storage member fitting snugly in the lower end of the vessel, a heater in the upper portion of said heat storage member, and conductors leading from the heater through and up the side of the vessel, the vessel being provided at its top with a lateral flange resting on the receptacle and in which the conductors are secured, the vessel, the heat storage member, the heater and the conductors being removable as a unit through the top of the receptacle.

2. An electric cooker comprising a receptacle having a heat-resisting bottom and walls and provided with an internal vertical groove in its side wall, a vessel fitting snugly in the receptacle and provided with a lateral annular flange resting on the upper end of the receptacle, a heat storage member in the lower end of the vessel, a heater in said member, and conductors leading from the heater through the side of the vessel and up the side of the vessel and secured in the lateral annular flange, the upwardly extending portions of the conductors being received in the vertical internal groove in the receptacle.

In testimony whereof I affix my signature.

GEORGE O. DITTON. [L. S.]